(12) United States Patent
McClure

(10) Patent No.: US 7,993,085 B2
(45) Date of Patent: Aug. 9, 2011

(54) EXPANDABLE COLLET ANCHOR SYSTEMS WITH CAPTIVE STUDS

(76) Inventor: Travis McClure, Kirkland, WA (US)

( * ) Notice: Subject to any disclaimer, the term of this patent is extended or adjusted under 35 U.S.C. 154(b) by 127 days.

(21) Appl. No.: 12/586,542

(22) Filed: Sep. 22, 2009

(65) Prior Publication Data

US 2010/0086376 A1 Apr. 8, 2010

Related U.S. Application Data

(63) Continuation-in-part of application No. PCT/US2008/003870, filed on Mar. 24, 2008.

(60) Provisional application No. 60/919,563, filed on Mar. 22, 2007.

(51) Int. Cl.
F16B 13/06 (2006.01)

(52) U.S. Cl. .......................................... 411/55; 411/80.6

(58) Field of Classification Search .................... 411/55, 411/60.2, 80.6, 105, 913
See application file for complete search history.

(56) References Cited

U.S. PATENT DOCUMENTS

| 5,065,490 A * | 11/1991 | Wivagg et al. | 29/402.17 |
| 5,993,129 A * | 11/1999 | Sato | 411/80.6 |
| 6,896,460 B2 * | 5/2005 | Enomoto et al. | 411/41 |

* cited by examiner

*Primary Examiner* — Gary Estremsky

(74) *Attorney, Agent, or Firm* — Sound Intellectual Property PLLC

(57) ABSTRACT

A collet body and captive stud combination is disclosed wherein the collet body has a first end and adjacent first wall portion, and a protrusion extending from an exterior surface thereof. The first wall portion also defines at least two secondary slots to create at least two fingers. The collet body also has a second end including a collet head and an opening for receiving a stud. At least a portion of an interior surface of the collet body is threaded to rotationally receive a threaded stud. The stud includes a head, a body portion being at least partially threaded, a distal end and at least one radially extending protrusion at or proximate to the distal end. The protrusion may be circumferentially continuous or discontinuous. The stud body portion is sized to fit through the collet body second end, and to prevent dislocation of the stud from the collet body once inserted in a collet body, the maximum diameter of the stud at the radially extending protrusion is greater than the minimum diameter of any essentially non-elastic portion of the collet body.

20 Claims, 6 Drawing Sheets

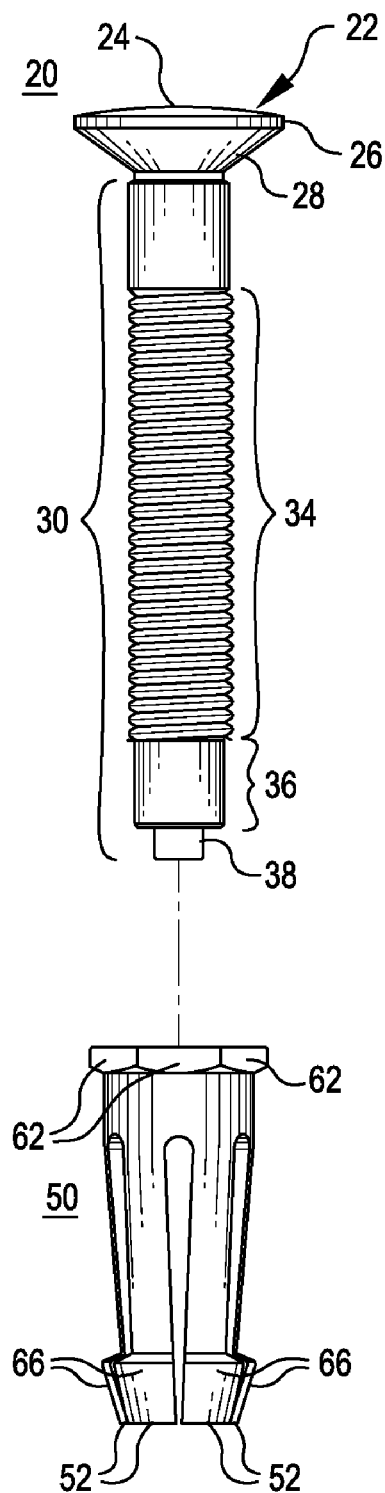
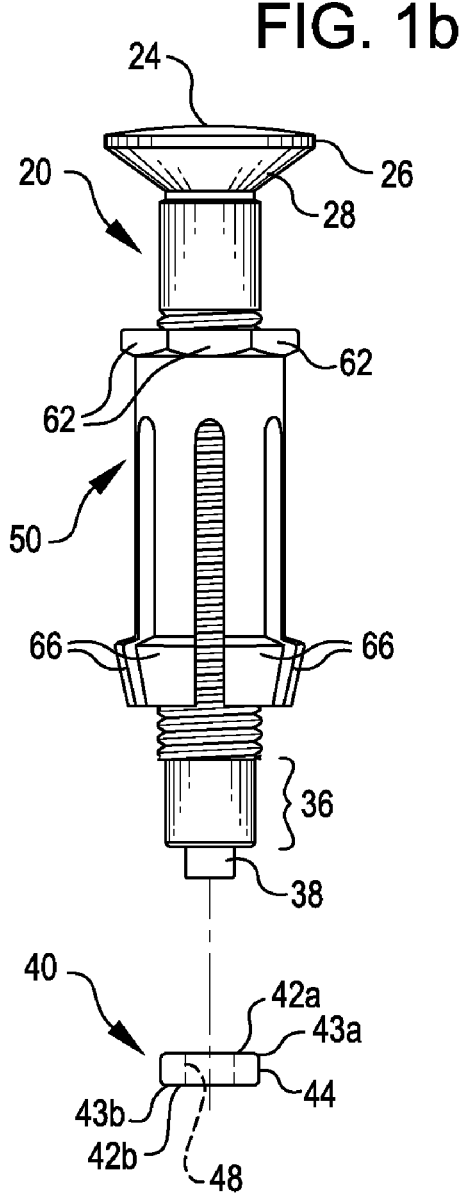

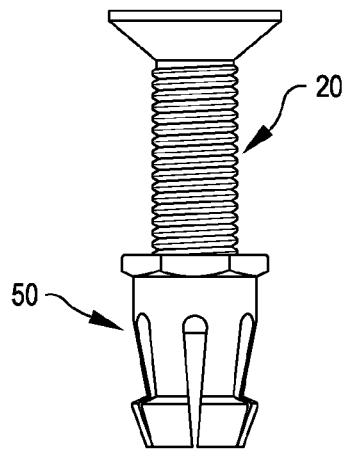
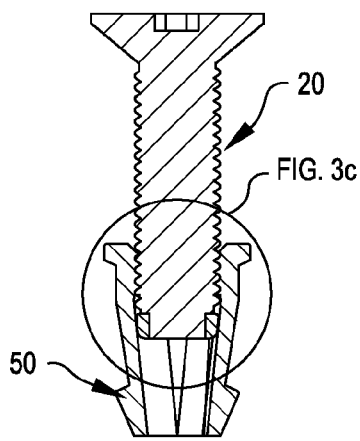
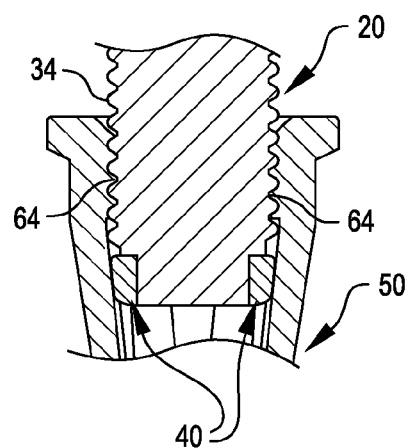
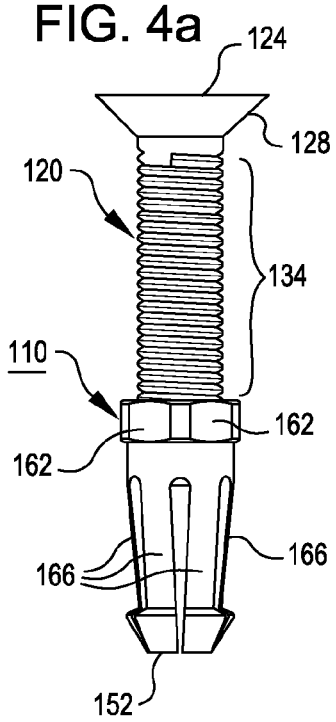
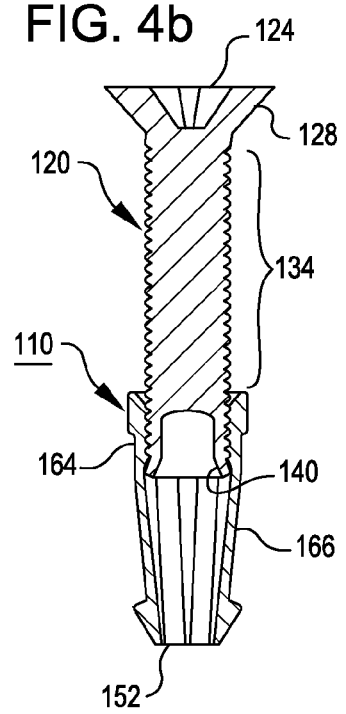

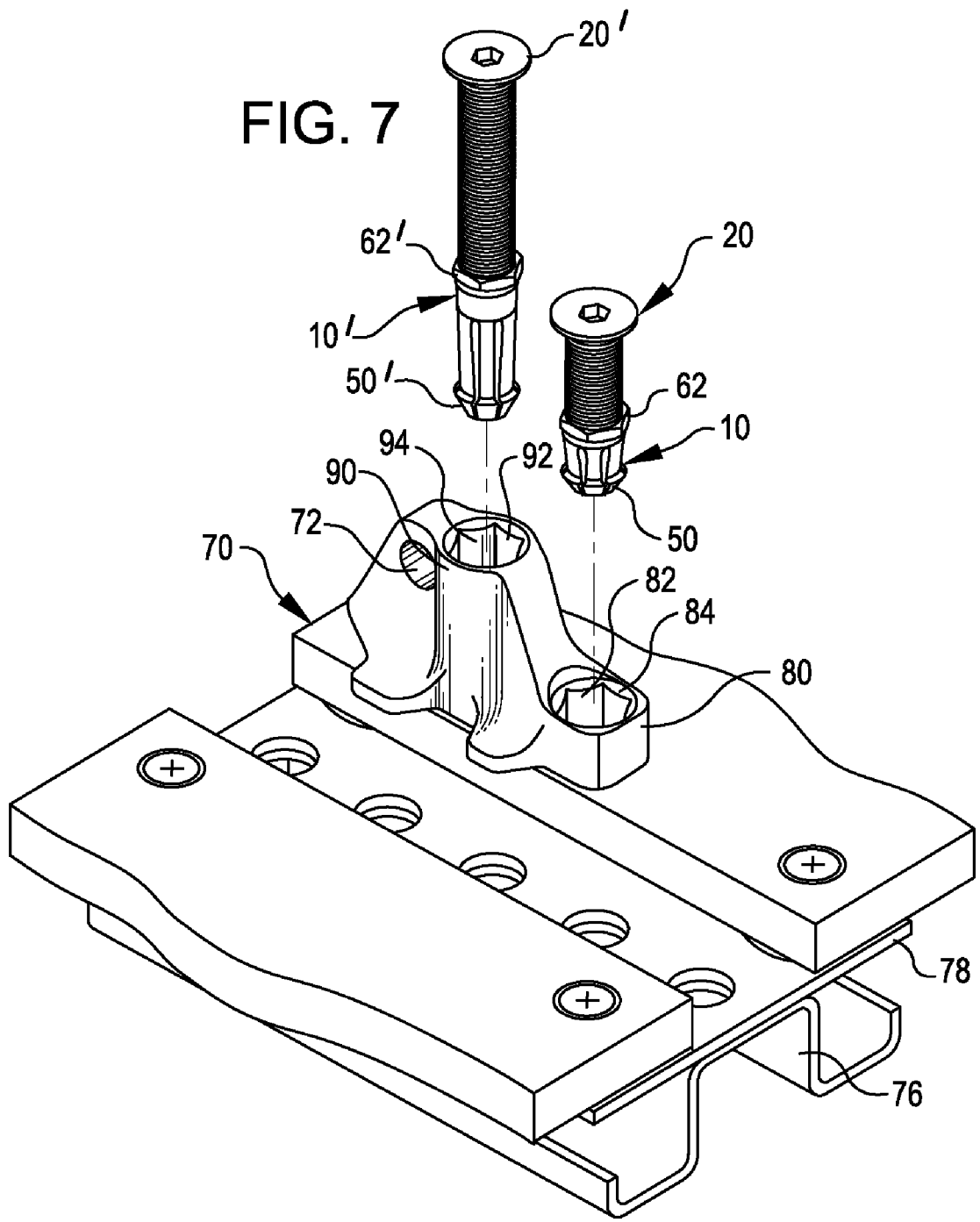

EXPANDABLE COLLET ANCHOR SYSTEMS WITH CAPTIVE STUDS

This is a continuation-in-part application that claims benefit, under 35 USC §120, of co-pending International Application PCT/US2008/003870, filed on 24 Mar. 2008, designating the United States, which claims priority to U.S. Provisional Application No. 60/919,563, filed 22 Mar. 2007, which application is incorporated herein by reference.

SUMMARY OF THE INVENTION

The invention is directed towards an expandable collet anchor system and structures including the same. The anchor system, in various embodiments, comprises a collet body according to the disclosure found in PCT/US03/02925 and published as WO 03/069971 A2, the disclosure of which is incorporated herein by reference, and a captive stud.

As disclosed in that publication, the collet body comprises a first end defining a generally circular opening and a first wall portion adjacent to the first end, where the first wall portion has an interior surface, an exterior surface, a protrusion extending from the exterior surface including a leading face oriented towards the first end and a trailing face oriented away from the first end. In addition, the first wall portion defines at least two secondary slots extending longitudinally from the first end to create at least two fingers having a distal end at the first end. The collet body also comprises a second end including a collet head at or proximate thereto having a maximum external diameter where the second end defines a generally circular opening having a minimum diameter. In the several embodiments, one of the head, the second end or the head and second end includes a threaded interior surface. At or adjacent to the second end is a second wall portion, where the second wall portion has an interior surface and an exterior surface. The interior surface of at least one of the first wall portion or the second wall portion defines threads for embodiments wherein the captive stud includes external threads. The collet body further comprises a collet body anti-rotation means for engaging with an auxiliary structure where the auxiliary structure defines a bore, hole, aperture or other opening formed through a section of auxiliary structure. The bore, hole or aperture has a first opening at one side of the auxiliary structure and a second opening at a second side thereof, with an internal surface geometry adapted to substantially translationally receive the collet body, without deformation, and operably function with the collet body anti-rotation means to prevent substantial rotation of the collet body therein. In certain applications of embodiments of the invention, the collet body wholly passes through the auxiliary structure first opening.

The captive stud of the anchor system embodiments of the invention comprises a stud head at a proximal end, a body portion being at least partially threaded for embodiments that rely upon rotational engagement of the captive stud with the collet body, a distal end and at least one radially extending protrusion at or proximate to the distal end. The radially extending protrusion may be circumferentially continuous or discontinuous. The stud body portion is sized to fit through the generally circular opening of the collet body second end while the stud head preferably, but not necessarily, has a diameter greater than that of the second end opening.

To prevent dislocation of the stud from the collet body once inserted in certain embodiments of the invention, the maximum diameter of the stud at the radially extending protrusion is greater than the minimum diameter of any essentially non-elastic portion of the collet body. In many embodiments, the maximum diameter is greater than the minimum diameter of any threaded portion of the collet body. Through this configuration, the interior surface of preferably at least a portion the second wall portion will contact the radially extending protrusion of the stud prior to complete withdrawal of the stud from the second end of the collet body. Thus, the stud cannot be separated from the collet body by passing the radially extending protrusion through the second end, nor can the stud pass there through in the opposite direction if the stud head has an outer diameter greater than a minimum inner diameter of the second opening.

The radially extending protrusion of the stud can be established by various means, including deformation of that portion of the stud wherein the protrusion is desired (e.g., axial impact deformation), swaging or otherwise bonding of a bushing or washer to the stud, rotationally linking a bushing or washer to the stud (the bushing or washer then acts as a bearing race, and is capable of rotation independent of the stud), locating expandable fingers thereat, and other means known to persons skilled in the art. In selected preferred embodiments, the protrusion is at the distal end of the stud, and therefore is that portion of the stud which contacts the interior surfaces of the collet body, thereby providing the radially expanding bias to urge the fingers radially outward when the stud is inserted through the collet body. Because of this arrangement, certain embodiments provide for a conforming contact surface on the outer surface of the protrusion to provide enhanced translation between it and the interior surface of the collet body, and to effectively distribute radial expansion forces.

A feature of the described system embodiment of the invention is the incorporation of a reduced diameter portion between the radially extending protrusion and at least a portion of the threaded body portion of the stud. The reduced diameter portion has a longitudinal length "$L_{RD}$" and a diameter generally less than the minimum diameter of any threaded interior surface of the collet body. Preferably, the threaded interior surface of the collet body has a longitudinal length "$L_{CT}$", and "$L_{RD}$" is greater than or equal to "$L_{CT}$". In this manner, when the radially extending protrusion abuts the threaded portion of the collet body, at least part of the reduced diameter portion is adjacent thereto, thereby permitting the stud to freely rotate within the collet body without engagement when not engaged with the threads. This feature is particularly useful when removing the collet and stud system from use: the user rotates the stud such that it begins to back out from the collet body until the complementary threads completely disengage. The radially extending protrusion then abuts a portion of the threaded collet body interior surface, thereby preventing the stud from fully backing out, and providing a convenient means for removing the now collapsed collet body from the auxiliary structure and/or work piece.

Captive studs in systems according to the invention have several states, namely, free running where the stud is not threadably engaged with the collet body, initial contact where the stud has just threadably engaged with the collet body but has yet to substantially react against the fingers of the collet body, and fully engaged where the fingers of the collet body have been radially extended. In certain applications, the radially protruding portion may extend beyond collet body distal ends of the fingers. In such instances, the stud body (including threaded portion) will maintain contact with the fingers to prevent potential radial collapse of the same. Because some embodiments of the stud include an exposed portion of the reduced diameter portion between the radially protruding portion and the threaded portion, there may be a partial radial collapse of the fingers when the distal ends encounter this portion. To facilitate retraction of the protruding portion into the collet body in such instances, the protruding portion may include a chamfer, bevel, or curvilinear surface at the edge thereof that initially contacts the fingers during collet retraction. Alternatively or in conjunction therewith, the internal surface of the fingers at their distal ends may also be formed to facilitate this action such as by chamfer, bevel or rounding.

Another feature of certain expandable collet anchor systems according to the invention is the incorporation of an axial biasing element disposed between the collet body (and preferably the second end of the collet body) and the stud head, and may comprise one of a resilient metal coil spring, a resilient washer or bushing or similar element.

Still another feature of system embodiments of the invention involves the use of enhanced friction means between the collet body and the stud body portion to prevent unintended rotation of the stud relative to the collet body when threadably engaged therewith. This means is preferably achieved by modifying the thread characteristics of the stud, the collet body or both. Alternative means include, but are not limited to, inclusion of a deformable or malleable solid or liquid (including paste and colloidal suspensions) material between the stud body portion and the collet body.

As described above, the collet body anti-rotation means reacts with an auxiliary structure. This auxiliary structure may comprise the work piece (either intrinsic or in conjunction there with) to be used with the collet anchor system, or may be used in conjunction with the work piece to be used with the collet anchor system. With regard to nearly any anti-rotation means, there is therefore a reacting component and a reacted upon component. For convenience and convention, the former (reacting component) will be characterized as the first part of an anti-rotation means while the latter (reacted upon component) will be characterized as the second part. With respect to the embodiments of the invention shown and/or described herein, the collet body comprises the first part or reacting component of the anti-rotation means, and the auxiliary structure comprises the second part or reacted upon component of the anti-rotation means: the composition of the auxiliary structure inherently includes at least one feature complementary to the collet body anti-rotation means.

As described herein, a second part of the anti-rotation means is defined as at least one internal surface portion of the bore, hole or aperture formed through the auxiliary structure. That portion of the collet body that compressively contacts the second part of the anti-rotation means during rotation of the collet body is defined herein as the first part of the anti-rotation means. While preferred embodiments have a plurality of such rotationally compressive contact locations, it is only necessary to have at least one such portion of compressive contact during attempted rotation of the collet body. To permit axial translation of the collet body in the auxiliary structure, the second part of the anti-rotation means has a horizontal (normal to the bore, hole or aperture axis) cross sectional profile that permits substantial axial translation of the collet body there through. In many embodiments of the invention, the fit between the collet body and the auxiliary structure is such that the collet body can pass completely through one side of the bore, hole or aperture.

While the anti-rotation means need only a single point of rotational interference between the first and second parts in order to function, many preferred embodiments of the invention comprise, as the first part of the anti-rotation means, a plurality of planar faces formed on the exterior surface of the second end of the collet body. The second part of the anti-rotation means therefore comprises an internal surface portion of the bore, hole or aperture formed through the auxiliary structure having at least one portion thereof with a horizontal cross sectional profile that accepts insertion of the collet body second end there through. Preferably, the internal dimensions of the bore are slightly larger than the complementary external dimensions of the second end exterior surface so that the collet body can smoothly translate within the bore. In certain embodiments, and to ensure that the collet body does not completely translate through the bore, a portion of the bore includes a collet body seat for receiving and arresting translation of the collet body (this prevents the collet body from unintentionally exiting the bore on the side opposite the insertion side). In addition, certain embodiments of the auxiliary structure include a stud head seat in or at a bore periphery for receiving and arresting translation of the stud when inserted into the bore. Operatively, the stud head seat is preferably located distally from the collet body seat.

Those persons skilled in the art will appreciate that any auxiliary structure intended to be compressively linked to another structure (such as a seat monument to a floor track, as will be described in more detail below) can be designed to include at least one bore feature that compressively interacts with a suitable collet body in a rotational mode to prevent unintended rotation of the collet body in the bore. By the same token, those persons skilled in the art will appreciate that not all of the interactions between the collet body and the auxiliary structure may be with a single auxiliary structure, but may occur over several stacked elements; a stud head seat may exist in an exposed structure, the second part of the collet body anti-rotation means may exist in a structure adjacent to the exposed structure (e.g., a first intermediate structure), and a collet body translation arresting means (e.g., a collet body seat) may exist in a structure adjacent to the first intermediate structure. Moreover, the auxiliary structure need not be a work piece, one form of which will be described in detail below. It can be an element specifically adapted for use in conjunction with the system of the invention, such as a collet body insert as is described in PCT/US03/02925, which has previously been incorporated by reference.

A particular form of auxiliary structure for use with an expandable collet anchor system of the invention is a track monument derivative for use particularly in commercial passenger aircraft applications. In this arrangement, linear tracks support a plurality of floor panels. Each track comprises a plurality of holes that are in alignment with a plurality of holes in the floor panels. The panels may be attached to the tracks using conventional fasteners or preferably blind side fasteners. The seat monument embodiments of the invention are preferably removably anchored to the track with similar fasteners via the track and panel holes. By using the collet body and stud system of the invention, monuments according to the invention can be quickly installed and removed without requiring access to the underside of the panels nor forming threads in the tracks or other structures, as will now be described.

Each monument according to the invention acts as a mounting interface between an accessory, such as a passenger seat or partition, and the sub-floor track. Monuments according to the invention comprises a body having a forward portion, a mid portion and a rear portion. Each such monument has at least one mounting bore having an axis preferably generally orthogonal to the floor panels to receive the expandable collet anchor system according to the invention, which is used to compressively anchor the monument to the track. Depending upon implementation parameters, the monument may further comprise at least one auxiliary bore to engage with a seat strut via a fastener. While preferred embodiments usually include a second mounting bore, if only a single mounting bore is present, the monument preferably additionally comprises a mounting pin or location stud in register with at least some of the plurality of track holes.

In addition to the foregoing, each mounting bore in monuments according to the invention comprises the second part of the collet body anti-rotation means. Thus, the at least one mounting bore has a horizontal cross sectional profile that permits at least partial translation of the collet body therethrough while obstructing the collet body from rotation of 360° and beyond, and preferably only a few degrees. In addition, the at least one mounting bore comprises, in certain embodiments of the invention, a stud head seat at an upper portion thereof and a collet seat at a lower portion thereof.

A feature of the mount in selected embodiments of the invention includes collet body translation inspection means for determining the location of the collet body in a mounting bore. The translation inspection means permits user inspection of the degree of collet body translation within the bore so that it can be determined if the collet body has satisfactorily achieved expected positioning and therefore engagement with the mount and the track. In one series of embodiments, the translation inspection means comprises a generally linear inspection bore extending radially outwardly from an orifice at the mounting bore internal surface to the environment. By establishing the inspection bore at a location where the second end of the collet body is expected upon successful engagement of the expandable collet anchor system with the mount and the track, a user can rapidly determine if the installation is successful. If the bore is sufficiently sized, it can be used as a "go-no go" gauge. This feature is of course portable and may apply to any auxiliary structure, whether a work piece or other element.

In certain aircraft seat applications, the forward seat struts are characterized by a flange member at distal ends thereof. To take advantage of the fastening improvements associated with the invention embodiments, a front mount fitting can be used. The fitting comprises a body having a forward portion, a mid portion and a rear portion. Each fitting has at least one mounting bore to receive an expandable collet anchor system according to the invention, which is used to compressively anchor the fitting to the track. The mount further comprises at the front end at least one longitudinally oriented slot to receive and engage with the seat strut flange. If only a single mounting bore is present, the fitting preferably additionally comprises one of a pin or a second vertically oriented bore for engagement with the track, in register with some of the plurality of track holes.

BRIEF DESCRIPTION OF THE DRAWINGS

FIGS. 1a-d are side elevations view of a first series embodiment of an expandable collet anchor system according to the invention particularly illustrating the association of a collet body and retaining bushing with a stud;

FIGS. 3a and 3b are side elevation and cross section side elevation views respectively of the first series embodiment of an expandable collet anchor system according to the invention at an initial thread engagement state between the stud and the threaded collet body;

FIG. 3c is a detailed view of FIG. 3b;

FIGS. 4a and 4b are side elevation and cross section side elevation views respectively of a second series embodiment of an expandable collet anchor system according to the invention at a "free running" state and prior to stud engagement with the threaded collet body;

FIG. 7 is a perspective view of a seat mount and seat track using the expandable collet anchor system of FIG. 1;

FIG. 8b is a detailed view of one expandable collet anchor system of FIG. 8a;

FIG. 9b a detailed view of one expandable collet anchor system of FIG. 9a

DESCRIPTION OF THE EMBODIMENTS

Figure 1C:
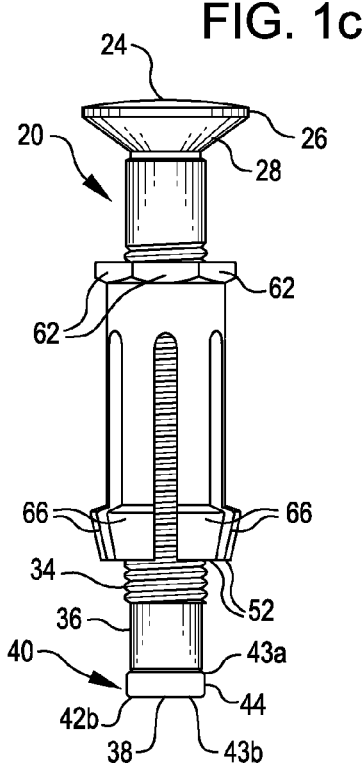
Figure 1D:
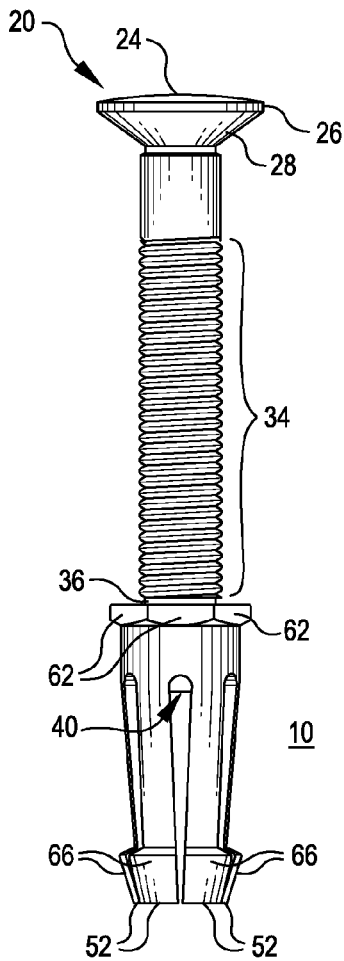

The following discussion is presented to enable a person skilled in the art to make and use the invention. Various modifications to the preferred embodiment will be readily apparent to those skilled in the art, and the generic principles herein may be applied to other embodiments and applications without departing from the spirit and scope of the present invention as defined by the appended claims. Thus, the present invention is not intended to be limited to the embodiment show, but is to be accorded the widest scope consistent with the principles and features disclosed herein.

The terms "area", "boundary", "part", "portion", "surface", "zone", and their synonyms and plural forms, as may be used herein, are intended to provide descriptive references or landmarks with respect to the object being described. These terms are not intended, nor should be inferred, to delimit or define per se elements of the referenced object, unless specifically stated as such or facially clear from the several drawings and the context in which the term(s) is/are used. In addition, the terminal ends of numeric lead lines in the several drawings, when associated with any such term(s), are intended to representatively identify such references or landmarks with respect to the object being described. They are not intended, nor should be inferred, to delimit or define per se boundaries of the referenced object, unless specifically stated as such or facially clear from the drawings and the context in which the term(s) is/are used. Unless specifically stated as such or facially clear from the several drawings and the context in which the term(s) is/are used, all words and visual aids should be given their common commercial and/or scientific meaning consistent with the context of the disclosure herein.

Turning then to the several drawings wherein like numerals indicate like parts, and more particularly to FIGS. 1a-d, which illustrate preferred assembly steps for creating expandable collet anchor system 10. As shown therein, system 10 according to the invention comprises threaded stud 20 and threaded collet body 50. Stud 20 and collet body 50 are preferably used in the aerospace industry although system 10 can be applied in any industry or application where blind side fastening is desired. System 10 is particularly adapted for use where the fastening of one work piece to another is intended to be non-permanent; as noted above a feature of system 10 is the ability to insert and remove the system from at least one work piece.

Both stud 20 and collet body 50 are preferably constructed from steel. In the illustrated embodiment, stud 20 includes head 22 having upper surface 24, peripheral surface 26 and bevel surface 28. Stud 20 further includes body 30 having threaded portion 34, non-threaded portion 36 and reduced diameter portion 38.

Stud 20 also includes bushing 40, which is similarly constructed from steel and has an internal diameter selected to achieve one of a generally interference fit with reduced diameter portion 38 of stud 20, or a generally freely rotationally coupling with reduced diameter portion 38. In the first instance, any mode of secure fastening between bushing 40 and stud 20 is within the range of suitable means, and includes, without limitation, swaging, welding, chemical bonding, penetration linkages (e.g., set screw(s)), and others known to the skilled practitioner in the art. In the second instance, a terminal swaging sufficient to retain bushing 40 or its equivalent will suffice, as well as other means known to the skilled practitioners.

Bushing 40 has first perimeter edge 43a located between first surface 42a and periphery 44, and second perimeter edge 43b located between second surface 42b and periphery 44. In addition, bushing 40 has a tapered profile and interior surface 48, which defines the previously described internal diameter.

Figure 2A:
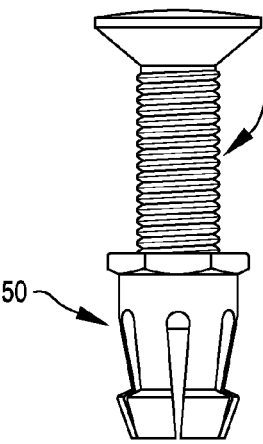
FIGS. 2a and 2b are side elevation and cross section side elevation views respectively of the first series embodiment of an expandable collet anchor system according to the invention at a "free running" state and prior to stud engagement with the threaded collet body.
Figure 2B:
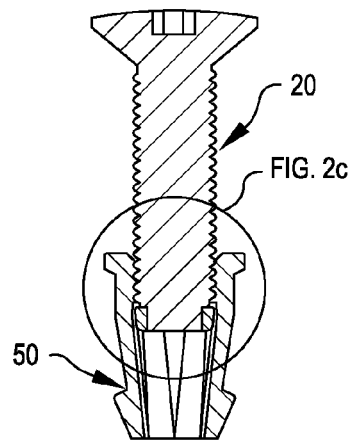
Figure 2C:
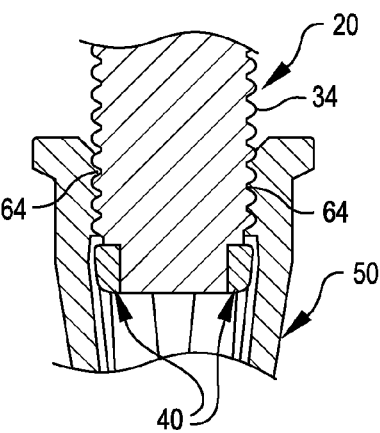
FIG. 2c is a detailed view of FIG. 2b.
Figure 5A:
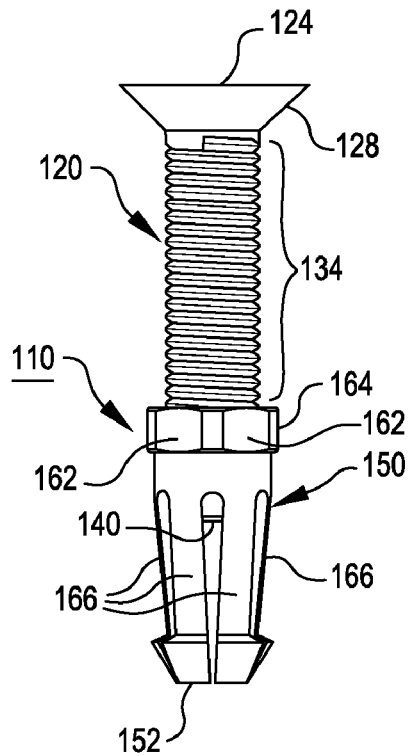
FIGS. 5a and 5b are side elevation and cross section side elevation views respectively of the second series embodiment of an expandable collet anchor system according to the invention at an initial thread engagement state between the stud and the threaded collet body.
Figure 5B:
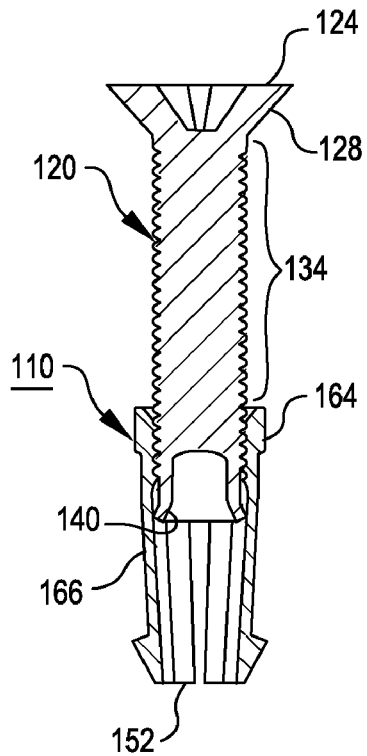
Figure 6A:
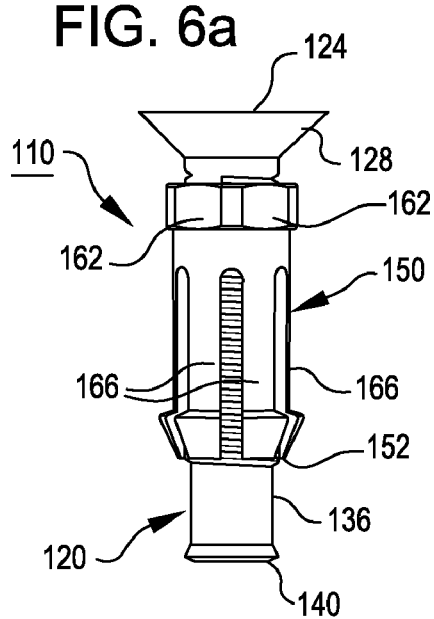
FIGS. 6a and 6b are side elevation and cross section side elevation views respectively of the second series embodiment of an expandable collet anchor system according to the invention at a fully engaged state between the stud and the threaded collet body.
Figure 6B:
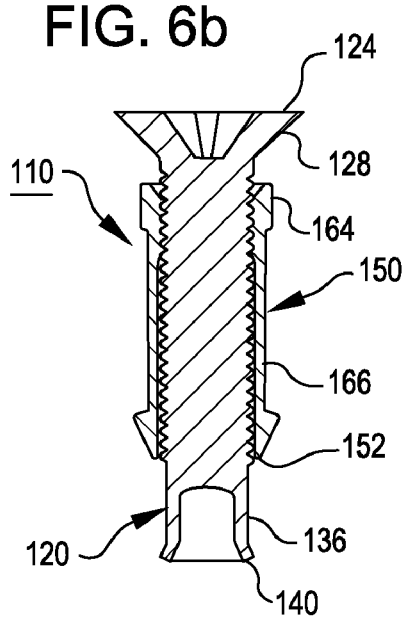

As best shown in FIG. 1c, bushing 40 has a maximum external diameter at perimeter edge 43a that is greater than the diameter of non-threaded portion 36 of stud 20 (in the illustrated embodiment, the diameter of stud 20 at the thread roots is generally the same as that of non-threaded portion 36). Thus, and as best illustrated in FIG. 2c, perimeter edge 43a interferes with threaded portion 64 of collet body 50 when stud 20 and collet body 50 are brought into tension and when threads 34 are not engaged with threaded portion 64. As a consequence, stud 20 is considered to be in a "free running" state with respect to collet body 50—threaded portion 64 of collet body 50 is only in contact with non-threaded portion 36 of stud 50, and abutment of bushing 40 with threaded portion 64 prevents undesired axial removal of stud 20 from collet body 50.

From the foregoing paragraph it can be seen that a free running state can be achieved by ensuring that at least a portion of stud 50 has, at the end wherein bushing 40 is located, a non-threaded portion or equivalent (e.g., reduced diameter portion, with or without threads) such that engagement between the stud and the collet body at this location is not possible at least when the bushing is in contact with the collet body threaded portion. Thus, this portion of the stud (the area between perimeter surface 43a and threads 34) has an axial length at least as great as the axial length of threaded portion 64 of collet body 50.

Both perimeter surface 43a and perimeter surface 43b include chamfered, beveled or rounded profiles, and bushing 40 includes a tapered portion. See FIGS. 2c and 3c. These features assist in operation of system 10 as will now be described. As is well known in the art, the force required to radially spread fingers 66 is greatest near their points of pivot (a torque arm is most difficult to move adjacent to its point of pivot and least difficult at the end of the arm). Because system 10 is intended for applications were repeated insertion and removal of collet body 50 from one or more work pieces occurs, component wear and fatigue can be reduced, and stud 20 rotation forces reduced if there is greater contact area between bushing 40 and collet body 50. To this end, tapered portion 46 has a degree of taper generally equivalent to that of fingers 66 of collet body 50 when in the relaxed state. See FIGS. 2c and 3c. Thus, when stud 20 is rotated and threads 34 engage with threaded portion 64 as shown in FIG. 3c, essentially full contact between tapered portion 46 and fingers 66 can be achieved. This large contact areas distributes the radial spreading forces and minimizes the likelihood of material deformation. Moreover, it also reduces the likelihood of binding during aggressive insertion/rotation of stud 20 in collet body 50.

As briefly described above, bushing 40 also preferably includes chamfered, beveled or rounded perimeter edge 43a and perimeter edge 43b. Perimeter edge 43b preferably has this profile to ensure the smooth transition of fingers 66 to the tapered portion of perimeter 44 during insertion actions. Perimeter edge 43a preferably has this profile to assist in retraction of bushing 40 into collet body 50. Referring to FIG. 1c, it can be seen that bushing 40, as well as adjacent portions of stud 20 (e.g., non threaded portion 36 and threads 34 proximate thereto) extend beyond distal ends 52 of fingers 66. However, because perimeter edge 43a has an external diameter greater than non-threaded portion 36, distal ends 52 of fingers 66 will collapse around non-threaded portion 36 may otherwise prevent re-expansion of fingers 66 when stud 20 is backed out of collet body 50. Therefore, a chamfer, bevel or curvilinear transition is formed in bushing 40 at perimeter edge 43a to avoid such an undesirable consequence. Of course, if the objective was to prevent the removal of system 10 from the work piece(s), then such a geometry would be considered highly desirable (the work pieces could be moved relative to each other, but not easily separated).

FIGS. 4a, 4b, 5a, 5b, 6a and 6b illustrate a second embodiment of an expandable collet anchor system according to the invention, namely system 110. Rather than incorporating a bushing as a stud retaining element as was the case with system 10, stud 120 of system 110 relies upon mechanical deformation of reduced diameter portion 138 at a distal end thereof. The result of this approach is a functional equivalent structure: the radial extending portion has an outer diameter greater than a minimum diameter of collet body 50 at threaded portion 36, with the result being that stud 120 is captive in collet body 50 as best shown in FIG. 4b. And while this embodiment lacks structure corresponding to periphery 44, which otherwise would reduce point loading (which could be addressed by alternative formation techniques or post deformation rolling), it does provide perimeter edge 143a. As with perimeter edge 43a of bushing 40, perimeter edge 143a of stud 120 facilitates retraction of stud 120 to a free running state.

Either system 10 or system 110 finds particular utility with respect to applications where frequent removal of the fastener is desired or required. An exemplary application is shown in FIG. 7 wherein seat mount 70 has first mounting bore 80 and second mounting bore 90, both adapted to translationally receive expandable collet anchor systems 10 and 10'. Seat mount 70 includes lateral bore 72 for receiving a fastener associated with a seat and register pin 74, which locates in one of the holes defined by track 76 and floor panel 78. Mounting bores 80 and 90 are spaced to be in registry with the holes defined by track 76 and floor panel 78. Expandable collet anchor system 10 comprising stud 20, collet body 50 and associated elements is sized to operatively engage mount 70 via mounting bore 80 while system 10' and its associated elements are sized to operatively engage mount 70 via mounting bore 90.

Internal surfaces 84 and 94 of respective bores 80 and 90 provide the necessary reactive structure (second part of the anti-rotation means) to faceted portion 62 and 62' of collet bodies 50 and 50' respectively. Turning then to FIGS. 8a, 8b, 9a and 9b, it can be seen in the first instance that collet bodies 50 and 50' are functionally similar, and materially differ only in axial length; the increased distance between track 76 and collet seat 92' when compared to track 76 and collet seat 92 necessitates the use of collet body 50'. Alternatively stated, because faceted internal surface 94 only extends part way through mount 70 (smooth bore 96 completes the transit), a longer collet body 50' must be used. If structural concerns where not at issue, there is no reason why the characteristics of bore 80 could not be reproduced in bore 90. In all other material respects, collet body 50' is functionally the same as collet body 50.

Figure 8A:
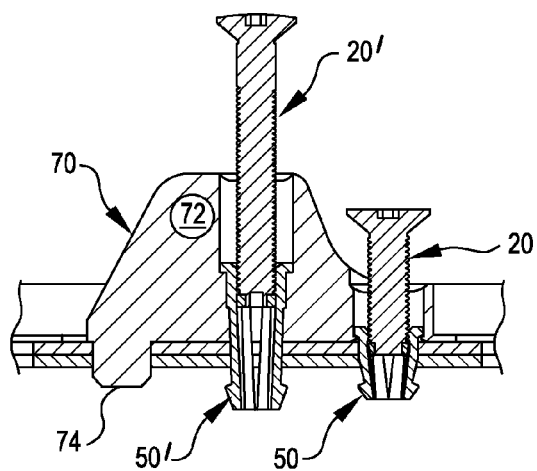
FIG. 8a is a side elevation view in cross section of the seat mount of FIG. 7 where a pair of expandable collet anchor systems have been inserted in a pair of mounting bores.
Figure 8B:
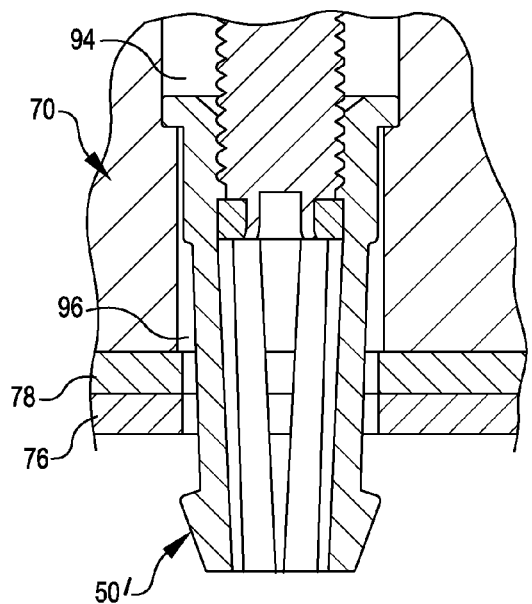
Figure 9A:
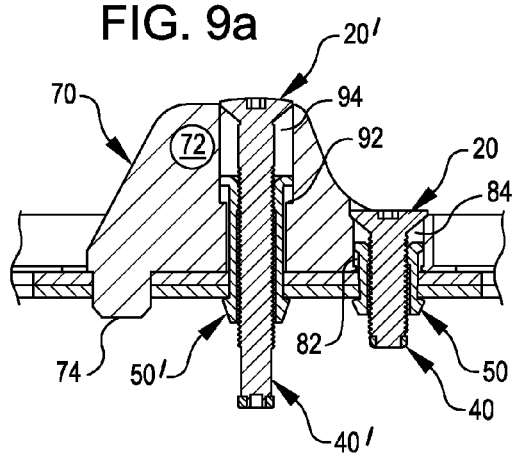
FIG. 9a is a side elevation view in cross section of the seat mount of FIG. 7 where the pair of expandable collet anchor systems have engaged and anchored the seat mount of FIG. 7 to the seating track.
Figure 9B:
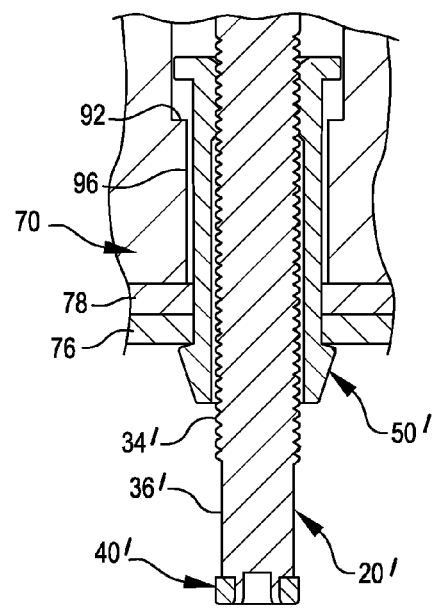

Installation of either collet body 50 or 50' follows FIGS. 8a and 8b: the collet body is inserted into the bore (FIGS. 8a and 8b) and an axial compressive force is presented to stud, which causes initial thread engagement (see, for example FIG. 5b) where after a rotational force is applied in addition to the axial compressive force to arrive at the result of FIGS. 9a and 9b. Note in these figures that both collet bodies 50 and 50' are no longer in contact with collet seats 82 and 92, and that collet bodies 50 and 50' as well as studs 20 and 20' are in tension. Removal is accomplished by simply reversing the initial direction or rotation (counterclockwise for right-hand threading) and pulling the system out from the bore.

What is claimed:

1. An expandable collet anchor system comprising:
    a collet body defining a longitudinal axis and comprising:
        a first end defining a generally circular opening;
        a first wall portion adjacent to the first end, the first wall portion having an interior surface, an exterior surface, a protrusion extending from the exterior surface having a leading face oriented towards the first end and a trailing face oriented away from the first end, and at least two secondary slots extending longitudinally from the first end to thereby create at least two fingers, each having a distal end at the first end;
        a second end defining a generally circular opening having a diameter;
        a second wall portion adjacent to the second end, the second wall portion having an interior surface and an exterior surface;
    a stud defining a longitudinal axis and comprising
        a stud head at a proximal end;
        a body portion;
        a distal end;
        at least one radially extending protrusion at or proximate to the distal end, wherein the stud body portion has at least one threaded portion and is sized to fit through the generally circular opening of the second end; and
        a first part of a collet body anti-rotation means for engaging with an auxiliary structure having a second part of the collet body anti-rotation means and substantially limiting rotation of the collet body when engaged with the auxiliary structure,
    wherein at least one interior surface of the collet body defines at least one threaded portion complementary to the at least one threaded portion of the stud, and wherein an interior portion of the collet body defines a minimum diameter that is less than a maximum diameter of the radially extending protrusion of the stud to prevent axial translation there past when at least the distal end of the stud is between the first end and the second end of the collet body.

2. The system of claim 1 wherein the stud further comprises a reduced diameter portion between the radially extending protrusion and the at least one threaded portion, the reduced diameter portion having a longitudinal length "$L_{RD}$" and a diameter less than a minimum diameter of the at least one threaded portion of the collet body.

3. The system of claim 2 wherein the at least one threaded portion of the collet body has a longitudinal length "$L_{CT}$", and wherein "$L_{RD}$" is greater than or equal to "$L_{CT}$".

4. The system of claim 1 wherein one of the collet body or the stud further comprises an enhanced friction means between the collet body at least one threaded portion and the stud at least one threaded portion for reducing unintended rotation of the stud relative to the collet body.

5. The system of claim 1 wherein the radially extending protrusion is one of an impact deformation of the distal end of the stud, a swaged annular member, a welded annular member, a bonded annular member, or a rotationally linked annular member.

6. The system of claim 5 wherein the radially extending protrusion comprises a bevel edge.

7. The system of claim 6 wherein the bevel edge is adjacent to the distal end of the stud.

8. The system of claim 6 wherein the bevel edge faces the proximal end of the stud.

9. The system of claim 1 wherein the second part of the anti-rotation means comprises at least one protrusion extending from the exterior surface of the collet body second wall.

10. The system of claim 1 wherein the first part of the anti-rotation means comprises at least one recess defined by the exterior surface of the collet body second wall and extending inwardly there from.

11. The system of claim 1 further comprising:
    an anchor body functioning as the auxiliary structure and defining at least one vertical bore hole extending from an upper surface thereof to a lower surface thereof and sized to receive the collet body, and defining at least one horizontal bore hole extending from a first side surface to a second side surface to accept another structure, wherein the at least one vertical bore hole has an internal wall with a cross sectional profile adapted to accept translational movement of the collet body.

12. The system of claim 1 further comprising a first part of a two-part anti-translation means located on an exterior surface of the collet body wherein the first part of a two-part anti-translation means is functionally matched to a second part of the two-part anti-rotation means found in the auxiliary structure.

13. The system of claim 11 further comprising a first part of a two-part anti-translation means located on an exterior surface of the collet body and a second part of the two-part anti-rotation means located in the at least one vertical bore hole.

14. The system of claim 1 wherein the stud further comprises a reduced diameter portion between the radially extending protrusion and the at least one threaded portion, the reduced diameter portion having a longitudinal length "$L_{RD}$" and a diameter less than a minimum diameter of the at least one threaded portion of the collet body, and wherein the radially extending protrusion is one of an impact deformation of the distal end of the stud, a swaged annular member, a welded annular member, a bonded annular member, or a rotationally linked annular member.

15. The system of claim 14 wherein the at least one threaded portion of the collet body has a longitudinal length "$L_{CT}$", and wherein "$L_{RD}$" is greater than or equal to "$L_{CT}$".

16. The system of claim 14 further comprising:
an anchor body functioning as the auxiliary structure and defining at least one vertical bore hole extending from an upper surface thereof to a lower surface thereof and sized to receive the collet body,
wherein the at least one vertical bore hole has an internal wall with a cross sectional profile adapted to accept translational movement of the collet body.

17. The system of claim 16 wherein the at least one threaded portion of the collet body has a longitudinal length "$L_{CT}$", and wherein "$L_{RD}$" is greater than or equal to "$L_{CT}$".

18. The system of claim 1 wherein the first part of the collet body anti-rotation means comprises a plurality of facets formed at or proximate to the collet body second end.

19. The system of claim 18 wherein the stud further comprises a reduced diameter portion between the radially extending protrusion and the at least one threaded portion, the reduced diameter portion having a longitudinal length "$L_{RD}$" and a diameter less than a minimum diameter of the at least one threaded portion of the collet body, and wherein the radially extending protrusion is one of an impact deformation of the distal end of the stud, a swaged annular member, a welded annular member, a bonded annular member, or a rotationally linked annular member.

20. An expandable collet anchor system comprising:
a collet body defining a longitudinal axis and comprising:
a first end defining a generally circular opening;
a first wall portion adjacent to the first end, the first wall portion having an interior surface, an exterior surface, a protrusion extending from the exterior surface having a leading face oriented towards the first end and a trailing face oriented away from the first end, and at least two secondary slots extending longitudinally from the first end to thereby create at least two fingers, each having a distal end at the first end;
a second end defining a generally circular opening having a diameter;
a second wall portion adjacent to the second end, the second wall portion having an interior surface and an exterior surface;
a stud defining a longitudinal axis and comprising
a stud head at a proximal end;
a body portion;
a distal end;
at least one radially extending protrusion at or proximate to the distal end, wherein the stud body portion has at least one threaded portion and is sized to fit through the generally circular opening of the second end; and
a first part of a collet body anti-rotation means for engaging with an auxiliary structure having a second part of the collet body anti-rotation means and substantially limiting rotation of the collet body when engaged with the auxiliary structure,
wherein at least one interior surface of the collet body defines at least one threaded portion complementary to the at least one threaded portion of the stud,
wherein an interior portion of the collet body defines a minimum diameter that is less than a maximum diameter of the radially extending protrusion of the stud to prevent axial translation there past when at least the distal end of the stud is between the first end and the second end of the collet body,
wherein the stud further comprises a reduced diameter portion between the radially extending protrusion and the at least one threaded portion, the reduced diameter portion having a longitudinal length "$L_{RD}$" and a diameter less than a minimum diameter of the at least one threaded portion of the collet body,
wherein the at least one threaded portion of the collet body has a longitudinal length "$L_{CT}$", and wherein "$L_{RD}$" is greater than or equal to "$L_{CT}$", and
wherein the radially extending protrusion is one of an impact deformation of the distal end of the stud, a swaged annular member, a welded annular member, a bonded annular member, or a rotationally linked annular member.

* * * * *